United States Patent
Lehtonen et al.

(10) Patent No.: US 12,122,908 B2
(45) Date of Patent: Oct. 22, 2024

(54) REINFORCED BIODEGRADABLE COMPOSITE MATERIAL

(71) Applicant: ARCTIC BIOMATERIALS OY, Tampere (FI)

(72) Inventors: Timo Lehtonen, Raisio (FI); Mika Laakkonen, Tampere (FI)

(73) Assignee: ARCTIC BIOMATERIALS OY, Tampere (FI)

( * ) Notice: Subject to any disclaimer, the term of this patent is extended or adjusted under 35 U.S.C. 154(b) by 556 days.

(21) Appl. No.: 17/288,230

(22) PCT Filed: Oct. 23, 2019

(86) PCT No.: PCT/EP2019/078797
§ 371 (c)(1),
(2) Date: Apr. 23, 2021

(87) PCT Pub. No.: WO2020/083959
PCT Pub. Date: Apr. 30, 2020

(65) Prior Publication Data
US 2021/0388201 A1    Dec. 16, 2021

(30) Foreign Application Priority Data

Oct. 24, 2018 (EP) .................................. 18202311

(51) Int. Cl.
*C08L 67/02* (2006.01)
*C08J 5/04* (2006.01)
*C08L 67/04* (2006.01)

(52) U.S. Cl.
CPC .............. *C08L 67/02* (2013.01); *C08J 5/043* (2013.01); *C08L 67/04* (2013.01); *C08J 2367/02* (2013.01); *C08J 2367/04* (2013.01); *C08J 2467/02* (2013.01); *C08J 2467/04* (2013.01); *C08L 2201/06* (2013.01)

(58) Field of Classification Search
CPC ...... C08L 67/02; C08L 67/04; C08L 2201/06; C08J 5/043; C08J 2367/02; C08J 2367/04; C08J 2467/02; C08J 2467/04; C08J 2201/06

See application file for complete search history.

(56) References Cited

U.S. PATENT DOCUMENTS

| | | | |
|---|---|---|---|
| 8,071,694 B2 | 12/2011 | Yu et al. | |
| 2009/0209695 A1 | 8/2009 | Yu et al. | |
| 2016/0185955 A1 | 6/2016 | Chen et al. | |

FOREIGN PATENT DOCUMENTS

| | | |
|---|---|---|
| EP | 2 243 749 | 10/2010 |
| JP | S63-225554 | 9/1988 |
| JP | 2004-143203 | 5/2004 |
| JP | 2005-179578 | 7/2005 |
| JP | 2005-232225 | 9/2005 |
| JP | 2005232225 A * | 9/2005 |
| JP | 2005-336220 | 12/2005 |
| JP | 2006-028333 | 2/2006 |
| JP | 2008-001859 | 1/2008 |
| JP | 2008-001959 | 1/2008 |
| JP | 2009-215492 | 9/2009 |
| WO | 2015/000081 | 1/2015 |

OTHER PUBLICATIONS

Translation of JP2005232225A (abstract, description and claims). (Year: 2005).*
Mar. 26, 2019 Search Report issued in European Patent Application No. 18202311.9, pp. 1-5.
Jan. 22, 2020 International Search Report issued in International Patent Application No. PCT/EP2019/078797, pp. 1-9.
Jun. 29, 2022 Office Action issued in Chinese Patent Application No. 201980075894.1, pp. 1-6.
Oct. 3, 2023 Office Action issued in Japanese Patent Application No. 2021-522441, pp. 1-5 [machine translation attached].

* cited by examiner

*Primary Examiner* — Catherine A. Simone
(74) *Attorney, Agent, or Firm* — Nixon & Vanderhye PC

(57) ABSTRACT

The present disclosure relates to a composite material comprising glass fiber and a polymer blend comprising polylactic acid (PLA) and polybutylene succinate (PBS), wherein the composite material comprises about 10 wt-% to about 80 wt-% of glass fibre, and wherein the polymer blend comprises about 20 wt-% to about 60 wt-% of PLA and about 40 wt-% to about 80 wt-% of PBS. The disclosure also relates to an article comprising the reinforced composite material.

30 Claims, No Drawings

REINFORCED BIODEGRADABLE COMPOSITE MATERIAL

This application is the U.S. national phase of International Application No. PCT/EP2019/078797 filed 23 Oct. 2019, which designated the U.S. and claims priority to EP Patent Application No. 18202311.9 filed 24 Oct. 2018, the entire contents of each of which are hereby incorporated by reference.

FIELD OF THE INVENTION

The present invention relates to a reinforced biodegradable composite material. More particularly, the invention relates to a reinforced polylactic acid based composite material with good heat resistance and toughness. The invention further relates to an article comprising said composite material.

BACKGROUND OF THE INVENTION

In recent years, environmental pollution due to the high impact of plastic waste in daily use has become a great concern. One of the possible solutions to this problem is to replace the commodity synthetic polymers with biodegradable polymers that are readily susceptible to hydrolysis and microbial action. Polylactic acid (PLA) and polybutylene succinate (PBS) are examples of environmentally-friendly biodegradable polymers which aim to replace commodity synthetic petroleum based polymers.

PLA is a biodegradable thermoplastic aliphatic polyester produced from renewable resources. PLA has good mechanical properties and therefore is a good polymer for various end-use applications. However, other properties of PLA like impact strength, heat deflection temperature (HDT), gas permeability, melt viscosity for processing, toughness etc. are not good enough in applications like durable goods. Since PLA as a raw material has been quite expensive and the production speed of PLA is quite low, it has not been economically feasible to apply PLA in day-to-day use as a consumable or durable goods material.

The various properties of PLA can be modified by mixing PLA with another suitable biodegradable polymer which has comparably better temperature resistance, impact strength and melt processability, for example. This method can be ineffective due to incompatibility of the two polymers (which is required to produce intermediate properties) and can reduce the renewable content and compostability of the material. PLA has been blended with polybutylene succinate (PBS) which has high flexibility, moderate impact strength, and thermal and chemical resistance.

WO 2015/000081 A1 discloses a heat resistant composition comprising polylactic acid, poly(butylene succinate) and a compostable polyester.

The problem of blending PLA and PBS together is the miscibility of these blends and the extent of miscibility is not entirely clear. It has been reported that the Tg of PLA did not change with addition of PBS, and hence concluded that the blends were immiscible, although they found that rheological results showed compatibility when the PBS content was below 20 weight %. On the other hand, it has been observed that PBS was miscible with PLA up to an addition level of 10 weight %. However, it has also been reported that PBS and PLA are thermodynamically incompatible and the blends exhibited an immiscible phase structure, with a phase inversion point of the blend system at a PLA/PBS ratio of 50/50.

Results reported in the literature for increasing the toughness of PLA on blending with PBS are somewhat disappointing. No improvement in the ductility (strain-to-break) of PLA/PBS blends was observed until the PBS content reached 90 weight %. The tensile strength decreased up to 80 wt % contents of PBS and then slightly increased at more than 80 wt % PBS contents. The same type of behavior was seen in Young's modulus.

Another way to increase the mechanical properties and heat resistance of PLA is by creating a composite through the addition of fillers which increase the stiffness of the material. However, this method can also reduce the impact resistance of the material, making it even more brittle and unsuitable in a number of applications. Another method of increasing the HDT of PLA is to increase the crystallinity, reducing the volume of amorphous material that softens at glass transition temperature, thereby allowing the product to retain its shape at higher temperatures. Increasing crystallinity however, often requires increasing the cooling time during molding or downstream after extrusion, which reduces the efficiency of the manufacturing process i.e. production speed. PLA crystallization as neat polymer is slow and requires nucleating agents, high crystallization temperature e.g. high mold temperature to speed up crystallization, even with the aid of nucleating agents the crystallization times are long and production speed too low compared to commodity synthetic petroleum based polymers e.g. PP and ABS. Moreover, such a high mold temperatures are not industry standard and requires investments.

There is still a need for biodegradable and compostable PLA based materials that are commercially viable, have high bio-based material content, and exhibit good mechanical properties, such as good impact resistance, high resistance to deformation, especially at elevated temperatures, good melt flow properties for injection molding and low cost.

BRIEF DESCRIPTION OF THE INVENTION

It was surprisingly found in the present invention that mechanical properties and heat resistance of PLA can be improved by blending PLA with polybutylene succinate, i.e. another biodegradable polymer, and by reinforcing the blend with glass fiber regardless of immiscibility of PLA and PBS blends.

Further, it was surprisingly found in the present invention, articles with good physical properties can be produced at low cost from a blend of PLA and PBS by introducing glass fiber to the blend.

Thus, in an aspect, the present invention provides a reinforced composite material comprising glass fiber and a polymer blend comprising polylactic acid and polybutylene succinate, wherein the composite material comprises about 10 wt-% to about 80 wt-% of glass fibre, and wherein the polymer blend comprises about 20 wt-% to about 60 wt-% of PLA and about 40 wt-% to about 80 wt-% of PBS.

Even if the prior art discloses that >20 wt-% blends of PLA with PBS are miscible, improvement of the above described shortcomings of PLA are not achieved by blending PLA and PBS in the miscible ratios. It was surprisingly found that good mechanical properties, high temperature resistance and toughness can be achieved by incorporating at least 10 wt-% of glass fibers into PLA/PBS blends when the PLA/PBS ratio is between about 20/80 wt-% to about 60/40 wt-%. Moreover, with these blending ratios together with glass fibers, the material cost and production cost can be kept low, since glass fiber cost is lower than that of PLA and PBS, and the production cycle times are shorter because crystallization of PLA can be avoided. The improvement of mechanical properties and temperature resistance increase with glass fiber content of at least 10 wt-%. Reduction of material cost is directly proportional to the glass fiber content.

In another aspect, the invention provides an article comprising the reinforced composite material of the invention. The articles include rigid packages, household good, electronic devices, and car interior parts.

The present invention provides a biodegradable PLA based composite material reinforced with glass fiber with high heat resistance and high mechanical properties.

An advantage the composite material of the invention and the article manufactured from the composite material of the invention is that they are biodegradable and compostable.

A further advantage of the composite material of the invention and the article manufactured from the composite material of the invention is that they have high mechanical properties, good impact resistance, good resistance to deformation especially at elevated temperatures and/or under load, and good melt flow properties for injection molding. In addition, the cost of the article manufactured from the composite material is low due to no need of in-process crystallization of PLA for achieving high temperature resistance, i.e. heat distortion temperature, and can be processed with comparable cooling time and cycle time with commodity synthetic petroleum based polymers e.g. PP and ABS and low mold temperature 20-50° C.

DETAILED DESCRIPTION OF THE INVENTION

In an aspect, the invention provides a reinforced composite material comprising glass fiber and a polymer blend comprising polylactic acid (PLA) and polybutylene succinate (PBS), wherein the composite material comprises about 10 wt-% to about 80 wt-% of glass fibre, and wherein the polymer blend comprises about 20 wt-% to about 60 wt-% of PLA and about 40 wt-% to about 80 wt-% of PBS.

In the reinforced composite material, any suitable polylactic acid may be used. The terms "polylactic acid", "polylactide" and "PLA" are used interchangeably to include homopolymers and copolymers of lactic acid and lactide based on polymer characterization of the polymers being formed from a specific monomer or the polymers being comprised of the smallest repeating monomer units. Polylactide is a dimeric ester of lactic acid and can be formed to contain small repeating monomer units of lactic acid or be manufactured by polymerization of a lactide monomer, resulting in polylactide being referred to both as a lactic acid residue containing polymer and as a lactide residue containing polymer. It should be understood, however, that the terms "polylactic acid", "polylactide", and "PLA" are not necessarily intended to be limiting with respect to the manner in which the polymer is formed.

Suitable PLAs produced from renewable resources include homopolymers and copolymers of lactic acid and/or lactide which have a weight average molecular weight ($M_w$) generally ranging from about 10,000 g/mol to about 800,000 g/mol. In an embodiment, $M_w$ is in the range from about 30,000 g/mol to about 400,000 g/mol. In another embodiment, $M_w$ is in the range from about 50,000 g/mol to about 200,000 g/mol.

Commercially available polylactic acid polymers which are suitable in the present invention include a variety of polylactic acids that are available from NATUREWORKS® or Total Corbion. Modified polylactic acid and different stereo configurations thereof may also be used, such as poly D-lactic acid, poly L-lactic acid, poly D,L-lactic acid, and combinations thereof.

Polybutylene succinate (PBS) is a biodegradable aliphatic polyester produced by the polycondensation reaction of 1,4-butanediol with succinic acid. Any suitable PBS or a co-polymer thereof can be used in the invention. PBS or a co-polymer thereof can be made from renewable or non-renewable resources. PBS may now be completely biobased depending on the choice of monomers.

PBS has high flexibility and moderate mechanical properties, such as impact strength, and good thermal and chemical resistance. PBS, in the form of films and moulded objects, exhibits significant biodegradation within several months in soil, water with activated sludge, and sea water. A disadvantage of PBS is its high cost.

High brittleness, low temperature resistivity as amorphous state of PLA and low mechanical properties with high cost of PBS are the major issues for their commercialization and many applications. Therefore, various properties of PLA and PBS based materials must be improved and the production cost must be lowered in order to make the PLA and PBS based materials commercially viable.

The reinforced composite material comprises a polymer blend comprising PLA and PBS. The amount of the polymer blend of the composite material is in the range of about 20 wt-% to about 90 wt-%, based on the weight of the composite material. In an embodiment, the amount is in the range of about 60 wt-% to about 90 wt-%.

In an embodiment, the amount of PLA of the polymer blend is in the range of about 30 wt-% to about 55 wt-% based on the weight of the polymer blend. In another embodiment, the amount of PLA is in the range of about 40 wt-% to about 50 wt-%. In a further embodiment, the amount of PLA is about 50 wt-%.

In an embodiment, the amount of PBS of the polymer blend is in the range of about 45 wt-% to about 70% wt-% based on the weight of the polymer blend. In another embodiment, the amount of PBS is in the range of about 50 wt-% to about 60 wt-%. In a further embodiment, the amount of PBS is about 50 wt-%.

In addition to PLA and PBS, the polymer blend can comprise further polymer(s). In an embodiment, the optional further polymers are biodegradable. These include, without limiting the polymers thereto: polylactides (PLA), poly-L-lactide (PLLA), poly-DL-lactide (PDLLA); polyglycolide (PGA); copolymers of glycolide, glycolide/trimethylene carbonate copolymers (PGA/TMC); other copolymers of PLA, such as lactide/tetramethylglycolide copolymers, lactide/trimethylene carbonate copolymers, lactide/d-valerolactone copolymers, lactide/ε-caprolactone copolymers, L-lactide/DL-lactide copolymers, glycolide/L-lactide copolymers (PGA/PLLA), polylactide-co-glycolide; terpolymers of PLA, such as lactide/glycolide/trimethylene carbonate terpolymers, lactide/glycolide/ε-caprolac-tone terpolymers, PLA/polyethylene oxide copolymers; polydepsipeptides; un-symmetrically 3,6-substituted poly-1,4-dioxane-2,5-diones; polyhydroxyalkanoates, such as polyhydroxybutyrates (PHB); PHB/b-hydroxyvalerate copolymers (PHB/PHV); poly-b-hydroxypropionate (PHPA); poly-p-dioxanone (PDS); poly-d-valerolactone-poly-ε-caprolactone, poly(ε-caprolactone-DL-lactide) copolymers; methylmethacrylate-N-vinyl pyrrolidone copolymers; polyesteramides; polyesters of oxalic acid; polyesters or copolymers of succinate acid; polydihydropyrans; polyalkyl-2-cyanoacrylates; polyurethanes (PU); polyvinylalcohol (PVA); polypeptides; poly-b-malic acid (PMLA); poly-b-alkanoic acids; polycarbonates; polyorthoesters; polyphosphates; poly(ester anhydrides); and mixtures thereof; and natural polymers, such as sugars, starch, cellulose and cellulose derivatives, polysaccharides, collagen, chitosan, fibrin, hyalyronic acid, polypeptides and proteins. Mixtures of any of the above-mentioned polymers and their various forms may also be used.

In an embodiment, the polymer blend consists of PLA and PBS. In an embodiment, the polymer blend contains about 20 wt-% to about 60% wt-% of PLA and about 40 wt-% to about 80% wt-% of PBS, based on the weight of the polymer blend, whereby the total amount PLA and PBS adds up to 100 wt-%. In another embodiment, the polymer blend contains about 30 wt-% to about 55 wt-% of PLA and about 45 wt-% to about 70 wt-% of PBS, the total amount of PLA and PBS being 100 wt-%. In a further embodiment, the polymer blend contains about 40 wt-% to about 50 wt-% of PLA and about 50 wt-% to about 60 wt-% of PBS, the total amount of PLA and PBS being 100 wt-%. In a still further embodiment, the polymer blend consists of about 50 wt-% of PLA and about 50 wt-% of PBS, the total amount of PLA and PBS being 100 wt-%.

In addition to the polymer blend described above, the reinforced composite material of the invention comprises glass fiber as a reinforcement. Any suitable glass fiber may be used in the composite material. Glass fiber can be conventional non-degradable glass fiber, such as E, S, C, AR, ECR. Glass fiber can also be biocompatible, biodegradable, bioresorbable or biosoluble glass fiber. In an embodiment, the glass fiber has the following composition: $SiO_2$ 60-70 wt-%, $Na_2O$ 5-20 wt-%, CaO 5-25 wt-%, MgO 0-10 wt-%, $P_2O_5$ 0.5-5 wt-%, $B_2O_3$ 0-15 wt-%, $Al_2O_3$ 0-5 wt-%, $Li_2O$ 0-1 wt-%, and less than 0.5 wt-% K.

In another embodiment, the glass fiber has the following composition: $SiO_2$ 65-75 wt-%, $Na_2O$ 12-17 wt-%, CaO 8-11 wt-%, MgO 3-7 wt-%, $P_2O_5$ 0.5-2.5 wt-%, $B_2O_3$ 1-4 wt-%, $K_2O>0.5$-4 wt-%, SrO 0-4 wt-%, and at most 0.3 wt-% in total of $Al_2O_3$ and $Fe_2O_3$.

The glass fiber can have any suitable length and thickness. Glass fiber of length of 5 mm or less is typically defined as short glass fiber (SGF). Glass fiber length of more than 5 mm is typically defined as long glass fiber (LGF).

The reinforced composite material of the invention comprises about 10 wt-% to about 80 wt-% of glass fiber. In an embodiment, the amount of glass fiber of the composite material is about 15 wt-% to about 70 wt-%. In another embodiment, the amount of glass fiber is about 20 wt-% to about 60 wt-%. In a further embodiment, the amount of glass fiber is about 20 wt-% to about 50 wt-%. In a still further embodiment, the amount of glass fiber is about 20 wt-% to about 40 wt-%.

In an embodiment, the present invention provides a compostable and/or biodegradable reinforced composite material. In this embodiment, the composite material contains biodegradable polymers which break down into harmless, environmentally acceptable chemicals, such as water, carbon dioxide and optionally methane. Decomposition of the composite material may occur, for example, through an anaerobic process under certain compost conditions. The decomposition of polymers under compost conditions is usually achieved in the presence of soil, moisture, oxygen and enzymes or microorganisms.

The reinforced composite materials of the invention may comprise a variety of additional ingredients including non-biobased and non-biodegradable ingredients. In an embodiment, any added ingredient is compostable and/or biodegradable.

The reinforced composite material of the invention may comprise impact modifier(s) without compromising already gained properties. Any suitable impact modifier may be used, including core shell acrylic elastomers. The impact modifier may be selected, for example, from Sukano im633 (Sukano), PARALOID BPM-520 (DowDuPont). The amount of the impact modifier(s) is typically from about 0.1 wt-% to about 20 wt-%, based on the weight of the reinforced composite material. In an embodiment, the amount of the impact modifier(s) is about 1 wt-% to about 10 wt-%. In another embodiment, the amount is about 2 wt-% to about 8 wt-%.

The reinforced composite material of the invention may comprise plasticizer(s) without compromising already gained properties. Any suitable plasticizer(s) may be used, including triethyl citrate, tributyl citrate, glycerol, lactic acid (monomer and oligomers). The amount of the plasticizer(s) is typically about 0.01 wt-% to about 20 wt-%, based on the weight of the reinforced composite material. In an embodiment, the amount is about 0.1 wt % to about 10 wt-%. In another embodiment, the about is about 0.5 wt-% to about 8 wt-%. In a further embodiment, the amount is about 0.8 wt-% to about 5 wt-%. In a still further embodiment, the amount is about 1 wt-% to about 4 wt-%.

The reinforced composite material of the invention may comprise flame retardant(s) without compromising already gained properties. Any suitable flame retardant(s) may be used, including Exolit AP 422 (Clariant), pentaerythritol phosphate (PEPA), melamine phosphate (MP) and polyhedral oligomeric silsesquioxanes (POSS). The amount of the flame retardant(s) is typically about 0.01 wt-% to about 30 wt-%, based on the weight of the reinforced composite material. In an embodiment, the amount is about 0.1 wt-% to about 20 wt-%. In another embodiment, the amount is about 0.5 wt-% to about 15 wt-%. In a further embodiment, the amount is about 3 wt-% to about 12 wt-%.

The reinforced composite material of the invention may comprise antioxidant(s) without compromising already gained properties. Any suitable antioxidant(s) may be used, including Irganox series (BASF), Irgafos series (BASF), Hostanox series (Clariant). The amount of antioxidant(s) is typically about 0.01 wt-% to about 20 wt-%, based on the weight of the reinforced composite material. In an embodiment, the amount is about 0.1 wt-% to about 10 wt-%. In another embodiment, the amount is about 0.5 wt-% to about 8 wt-%. In a further embodiment, the amount is about 0.8 wt-% to about 5 wt-%. In a still further embodiment, the amount is about 1 wt-% to about 4 wt-%.

The reinforced composite material of the invention may comprise UV and light stabilizer(s) without compromising already gained properties. Any suitable UV and light stabilizer(s) may be used, including Hostavin series (Clariant), Cesa block series (Clariant), OnCap Bio series (Polyone). The amount of the UV and light stabilizer(s) is typically about 0.01 wt-% to about 20 wt-%, based on the weight of the reinforced composite material. In an embodiment, the amount is about 0.1 wt-% to about 10 wt-%. In another embodiment, the amount is about 0.5 wt-% to about 8 wt-%. In further embodiment, the amount is about 0.8 wt-% to about 5 wt-%. In a still further embodiment, the amount is about 1 wt-% to about 4 wt-%.

The reinforced composite material of the invention may comprise colorant(s) without compromising already gained properties. Any suitable colorant(s) may be used, including Renol-natur series (Clariant), OnColor Bio series (Polyone). The amount of the colorant(s) is typically about 0.01 wt-% to about 10 wt-%, based on the weight of the reinforced composite material. In an embodiment, the amount is about 0.1 wt-% to about 7 wt-%. In another embodiment, the amount is about 0.5 wt-% to about 5 wt-%. In a further embodiment, the amount is about 0.8 wt-% to about 3 wt-%. In a still further embodiment, the amount is about 1 wt-% to about 2 wt-%.

The reinforced composite material of the invention may comprise antihydrolysis agent(s) without compromising already gained properties. Any suitable anti-hydrolysis agent(s) may be used, including Carbodilite series (Nisshinbo chemical), Stabaxol series (Lanxess). The amount of the anti-hydrolysis agent(s) is typically about 0.01 wt-% to about 10 wt-%, based on the weight of the reinforced composite material. In embodiment, the amount is about 0.1 wt-% to about 7 wt-%. In another embodiment, the amount is about 0.5 wt-% to about 5 wt-%. In a further embodiment, the amount is about 0.8 wt-% to about 3 wt-%. In a still further embodiment, the amount is 1 wt-% to about 2 wt-%.

Examples of other optional ingredients of the reinforced composite material of the invention include, but are not limited to, gum arabic, bentonite, salts, slip agents, crystallization accelerators or retarders, odor masking agents, crosslinking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, chitin, chitosan, and mixtures thereof.

The reinforced composite material of the invention may also comprise filler(s) without compromising already gained properties. Suitable filler(s)s include, but are not limited to, clays, silica, mica, wollastonite, calcium hydroxide, calcium carbonate, sodium carbonate, magnesium carbonate, barium sulfate, magnesium sulfate, kaolin, calcium oxide, magnesium oxide, aluminum hydroxide, talc, titanium dioxide, cellulose fibers, chitin, chitosan powders, organosilicone powders, nylon powders, polyester powders, polypropylene powders, starches, and mixtures thereof. The amount of the filler(s) is typically about 0.01 wt-% to about 60 wt-%, based on the weight of the reinforced composite material.

The reinforced composite material of the invention comprising at least 10 wt-% of glass fiber and a polymer blend of PLA/PBS in a ratio of about 20/80 wt-% to about 60/40 wt-% provides an economic composite material with good heat resistance and good mechanical properties and toughness. The cost of the PLA/PBS based material can be reduced in the present invention by introducing low-cost glass fiber to the material.

When conventional glass fibers are replaced with bioerodible and biodegradable glass fibers, the invention provides a reinforced composite material that is fully compostable.

In an aspect, the present invention provides a process for the production of the reinforced composite material of the invention. The process of the invention comprises the steps of:
  providing polylactic acid (PLA), polybutylene succinate (PBS) and glass fiber,
  optionally providing further polymer(s) and ingredients,
  blending PLA, PBS, optional further polymer(s) and optional ingredients together under heat treatment to provide a polymer melt in an extruder,
  adding glass fiber to the polymer melt to provide a reinforced polymer melt,
  extruding the reinforced polymer melt to provide a reinforced composite material,
  optionally pelletizing the reinforced composite material.

When short glass fiber (SGF) is used as a reinforcement, a twin-screw extruder is typically used to mix PLA, PBS and short glass fiber and optional other additives described above. The resultant mixture is extruded to strands and then pelletized to desired length of pellets. Besides of a strand pelletizer, an underwater or water ring pelletizer may be used.

A typical process for making long glass fiber (LGF) reinforced composite material of the invention, is to use LFT (long fiber reinforced thermoplastics) line. LFT line is a thermoplastic pultrusion process, where continuous glass fiber strands (direct roving or yarn) are impregnated by polymer melt which is usually provided by a twin-screw extruder to the impregnation die. The PLA/PBS blend together with optional additives are melted and mixed in the twin-screw extruder. The formed continuous glass fiber composite strands are then pelletized to the desired length and used for manufacturing the final article.

The heat deflection temperature (HDT) of the reinforced composite material of the invention was measured according to ISO 75:2013 Plastics—Determination of temperature of deflection under load, method B with 0.455 MPa load in case where SGF was used as a reinforcement in the composite material. The HDT of the article of the invention was measured according to ISO 75:2013 Plastics—Determination of temperature of deflection under load, method A with 1.82 MPa load in case where LGF was used as a reinforcement in the composite material.

The reinforced composite material of the invention exhibits a heat deflection temperature (HDT) of 85° C. or higher, measured according to the ISO standard 75 Method B. In an embodiment, the HDT is 90° C. or higher. In another embodiment, the HDT is 95° C. or higher. In a further embodiment, the HDT is 100° C. or higher.

The reinforced composite material of the invention exhibits a heat deflection temperature (HDT) of 85° C. or higher, measured according to the ISO standard 75 Method A. In an embodiment, the HDT is 90° C. or higher. In another embodiment, the HDT is 95° C. or higher. In a further embodiment, the HDT is 100° C. or higher.

The reinforced composite material of the invention exhibits an impact resistance (Izod notched impact strength) of 10 $kJ/m^2$ or above, measured according to the ISO 180 method 1A notched sample. In an embodiment, the impact resistance is 20 $kJ/m^2$ or above. In another embodiment, the impact resistance is 30 $kJ/m^2$ or above.

In an aspect, the present invention provides an article comprising the reinforced composite material of the invention. In an embodiment, the article is manufactured from the composite material by molding, such as injection molding, blow molding or compression molding. In another embodiment, the article is manufactured from the composite material by extrusion to provide for examples pipes, tubes, profiles, cables and films. Molded or extruded articles of the invention can be solid objects, such as toys, electronic appliances, and car parts, or hollow objects, such as bottles, containers, tampon applicators, applicators for insertion of medications into bodily orifices, medical equipment for single use and surgical equipment.

In an embodiment, the article of the invention has an average wall thickness of 0.6 mm or above.

The PLA/PBS based glass fiber reinforced composites of the present invention show advantageous properties, i.e. short cooling time and low downstream or mold temperatures, even if PLA is mainly amorphous. An important factor which influences the productivity in injection molding is so-called "Cycle Time". The term "Cycle Time" means the time period required in an injection molding system to mold a part and return to its original position/state and Cycle is complete, repeating sequence of operations for injection molding a part. As such, the term "Cycle Time" is generally used in the art and the meaning of the term is known to a skilled person.

Cooling time included in the cycle time is always directly related to article design and wall thickness. In this context low cooling time is meant comparable cooling time and cycle time with commodity synthetic petroleum based polymers e.g. PP and ABS. As used herein, the term "mainly amorphous" refers to compositions showing no or low levels of crystallinity. The present compositions are preferably fully compostable, where traditional glass fibers are replaced with bioerodible and biodegradable glass fibers.

It is contemplated that the different parts of the present description may be combined in any suitable manner. For instance, the present examples, methods, aspects, embodiments or the like may be suitably implemented or combined with any other embodiment, method, example or aspect of the invention. Unless defined otherwise, all technical and scientific terms used herein have the same meaning as is commonly understood by one of ordinary skill in the art to which this invention belongs. If a definition set forth herein is contrary to or otherwise inconsistent with a definition set forth elsewhere, the definition set forth herein prevails over the definition that is set forth elsewhere. Use of examples in the specification, including examples of terms, is for illustrative purposes only and is not intended to limit the scope and meaning of the embodiments of the invention herein.

The following example further illustrates the invention, without limiting the invention thereto.

Example

PLA polymer, HP2500 grade, from NatureWorks LLC, and PBS polymer, BioPBS FZ71 from PTTMCC, were used in the manufacture of a polymer blend. Two glass fiber grades were supplied by Nippon Electric glass, chopped strands (SGF) grade was ChopVantage HP3730 (fiber length 4.5 mm, diameter 10 microns) and direct roving (LGF) grade was Tufrow 4588 (diameter 17 microns).

The short glass fiber (SGF) reinforced PLA/PBS composites were compounded with a 25 mm twin-screw extruder (Coperion ZSK 26 MC[18]) and pelletized and dried before injection molding to the test samples.

The long glass fiber (LGF) reinforced PLA/PBS composites were manufactured by thermoplastic pultrusion process to LFT pellets (long fiber reinforced pellets, fiber length 8 mm) and dried before injection molding to the test samples.

The test sample was formed to comply with ISO test bar for testing tensile, flexural, impact and HDT properties. Test sample had a size of 10×4×80 mm.

Injection molding was conducted with Engel 200ton injection molding machine. The mold temperature for testing PLA/PBS composites, unreinforced PLA/PBS blends, and pure PBS and pure PLA was 30° C., except that the mold temperature of 110° C. was used in-process crystallization of PLA with nucleation agent LAK-301 from Takemoto Oil & Fat.

The used PLA/PBS ratios, glass fiber contents and results are presented in Tables 1 and 2. The reinforced composite material described in the Tables consisted of a polymer blend and glass fiber whereby the total amount of the blend and the glass fiber added up to 100 wt-% of the composite material. The polymer blend in each composite material consisted of PLA and PBS in amounts given in the Tables, adding up to 100 wt-% of the polymer blend.

The results of Tables 1 and 2 show that cold molded (at 30° C.) PLA reference materials have acceptable cycle times, but heat resistance HDT B is only 54° C. When in-process crystallization (i.e. annealing) was used with mold temperature of 110° C., HDT B is 122° C. and at an acceptable level, but the cycle time of 60 seconds is not. Regardless of mold temperature and cycle time, the impact strength of pure PLA is quite poor. On the other hand, pure PBS has good temperature resistance and short cycle time but shows poor mechanical properties including impact strength. PLA/PBS blends without glass fiber reinforcement showed good impact resistance, other mechanical properties being well below of pure PLA. Moreover, also the temperature resistance is poor (only about 53 to 55° C.).

The results further show that the reinforced PLA/PBS blend (50 wt-%/50 wt-%) of the present invention exhibits improved HDT and mechanical properties at low mold temperature of 30° C. and short cycle time of 20 seconds. The improvement of temperature resistance started to increase from 5 wt-% short glass fiber (SGF) addition. However, the improvement was low (HDT 63° C.). When the glass fiber (SGF) reinforcement level rose to 10 wt-%, heat resistance HDT B rose to acceptable level and comparable to oil-based plastics like ABS (HDT B about 88° C.). The mechanical properties other than impact strength were lower than those of pure PLA but comparable with ABS. The impact strength was improved against pure PLA by 104% and temperature resistance HDT B by 77%. When using glass fiber reinforcement more than 20 wt-%, all the properties were improved remarkably as shown in Table 3.

Long glass fiber reinforced PLA/PBS blend of the invention shows even better improvement in mechanical properties and temperature resistance compared with pure PLA (Table 3.) at a mold temperature of 30° C. and short cycle time of 20 seconds. As shown in table 2 the properties (flexural and tensile strength and HDT) started to decline when PLA/PBS ratio out of range of present invention.

TABLE 1

| Polymer/polymer blend/reinforced composite material | Mold temperature (° C.) | Cycle time (sec) | Flexural Strength, ISO 178 (MPa) | Flexural Modulus, ISO 178 (MPa) | Tensile Strength, ISO 527 (MPa) | Young's Modulus, ISO 527 (MPa) | Impact Izod Notched, ISO 180 (kJ/m$^2$) | HDT B ISO 75 (° C.) |
|---|---|---|---|---|---|---|---|---|
| ABS (reference) | 80 | 20 | 65 | 2200 | 44 | 2300 | 16 | 88 |
| PLA (reference)* | 110 | 60 | 111 | 4600 | 61 | 4460 | 6 | 122 |
| PLA (reference) | 30 | 20 | 110 | 3660 | 64 | 3800 | 5 | 54 |
| PBS (reference) | 30 | 20 | 42 | 635 | 32 | 670 | 7 | 95 |
| PBS 60% - PLA 40% (reference) | 30 | 20 | 54 | 1300 | 34 | 1396 | 9 | 55 |
| PBS 50% - PLA 50% (reference) | 30 | 20 | 57 | 1520 | 33 | 1644 | 12 | 54 |
| PBS 40% - PLA 60% (reference) | 30 | 20 | 61 | 1790 | 35 | 1927 | 15 | 54 |
| PBS 30% - PLA 70% (reference) | 30 | 20 | 66 | 2090 | 38 | 2156 | 15 | 53 |

TABLE 1-continued

| Polymer/polymer blend/reinforced composite material | Mold temperature (° C.) | Cycle time (sec) | Flexural Strength, ISO 178 (MPa) | Flexural Modulus ISO 178 (MPa) | Tensile Strength, ISO 527 (MPa) | Young's Modulus, ISO 527 (MPa) | Impact Izod Notched, ISO 180 (kJ/m²) | HDT B ISO 75 (° C.) |
|---|---|---|---|---|---|---|---|---|
| PBS 20% - PLA 80% (reference) | 30 | 20 | 70 | 2380 | 42 | 2470 | 12 | 53 |
| PBS 50% - PLA 50% - SGF5% (reference) | 30 | 20 | 81 | 2440 | 48 | 2714 | 9 | 63 |
| PBS 50% - PLA 50% - SGF10% | 30 | 20 | 99 | 3130 | 55 | 3498 | 10 | 89 |
| PBS 50% - PLA 50% - SGF20% | 30 | 20 | 130 | 4950 | 75 | 5483 | 13 | 108 |
| PBS 50% - PLA 50% - SGF30% | 30 | 20 | 156 | 7240 | 91 | 7870 | 15 | 112 |
| PBS 50% - PLA 50% - SGF50% | 30 | 20 | 174 | 12810 | 104 | 13584 | 10 | 115 |
| PBS 50% - PLA 50% - SGF55% | 30 | 20 | 174 | 13860 | 107 | 14711 | 12 | 115 |
| PBS 50% - PLA 50% - SGF60% | 30 | 20 | 188 | 15920 | 105 | 16963 | 11 | 115 |

*PLA + 1 wt-% nucleating agent (LAK-301 from Takemoto Oil & Fat)

TABLE 2

| Polymer/polymer blend/reinforced composite material | Mold temperature (° C.) | Cycle time (sec) | Flexural Strength, ISO 178 (MPa) | Flexural Modulus, ISO 178 (MPa | Tensile Strength, ISO 527 (MPa) | Young's Modulus, ISO 527 (MPa) | Impact Izod Notched, ISO 180 (kJ/m²) | HDT A, ISO 75 (° C.) |
|---|---|---|---|---|---|---|---|---|
| PLA 100% - LFG20 (reference) | 30 | 20 | 162 | 8840 | 116 | 8980 | 12 | 57 |
| PBS 100% - LGF20 (reference) | 30 | 20 | 102 | 5120 | 54 | 5538 | 21 | 112 |
| PBS 50% - PLA 50% - LGF20 | 30 | 20 | 132 | 6550 | 88 | 7141 | 18 | 109 |
| PLA 100% - LGF40 (reference)* | 110 | 55 | 206 | 13130 | 129 | 13000 | 14 | 162 |
| PLA 100% - LGF40 (reference) | 30 | 20 | 201 | 11140 | 131 | 11100 | 14 | 58 |
| PBS 100% - LGF40 (reference) | 30 | 20 | 108 | 7880 | 56 | 8508 | 19 | 112 |
| PBS 80% - PLA 20% - LGF40 | 30 | 20 | 207 | 9570 | 124 | 9822 | 34 | 111 |
| PBS 70% - PLA 30% - LGF40 | 30 | 20 | 207 | 9510 | 125 | 9692 | 36 | 110 |
| PBS 60% - PLA 40% - LGF40 | 30 | 20 | 210 | 10090 | 126 | 10137 | 32 | 110 |
| PBS 50% - PLA 50% - LGF40 | 30 | 20 | 210 | 10540 | 129 | 10733 | 30 | 106 |
| PBS 40% - PLA 60% - LGF40 | 30 | 20 | 206 | 11190 | 130 | 11242 | 28 | 89 |
| PBS 30% - PLA 70% - LGF40 | 30 | 20 | 191 | 11040 | 109 | 11822 | 23 | 64 |
| PBS 20% - PLA 80% - LGF40 | 30 | 20 | 183 | 11500 | 105 | 11878 | 29 | 58 |

*PLA + 1 wt-% nucleating agent (LAK-301 from Takemoto Oil & Fat)

TABLE 3

Improvement of composites of the invention against neat amorphous PLA

| Polymer/polymer blend/reinforced composite material | Flexural Strength, ISO 178 (MPa) | Flexural Modulus, ISO 178 (MPa) | Tensile Strength, ISO 527 (MPa) | Young's Modulus, ISO 527 (MPa) | Impact Izod Notched, ISO 180 (kJ/m²) | HDT B, ISO 75 (° C.) | HDT A, ISO 75 (° C.) |
|---|---|---|---|---|---|---|---|
| PLA 50% - PBS 50% - LGF20 | 20% | 79% | 37% | 88% | 262% | — | 118% |
| PLA 20% - PBS 80% - LGF40 | 88% | 161% | 94% | 158% | 578% | — | 121% |
| PLA 30% - PBS 70% - LGF40 | 88% | 160% | 95% | 155% | 619% | — | 121% |
| PLA 40% - PBS 60% - LGF40 | 91% | 176% | 98% | 167% | 542% | — | 119% |
| PLA 50% - PBS 50% - LGF40 | 91% | 188% | 101% | 182% | 497% | — | 112% |
| PLA 60% - PBS 40% - LGF40 | 87% | 206% | 103% | 196% | 462% | — | 78% |
| PLA 50% - PBS 50% - SGF10% | -10% | -14% | -15% | -8% | 104% | 77% | — |
| PLA 50% - PBS 50% - SGF20% | 18% | 35% | 18% | 44% | 168% | 117% | |
| PLA 50% - PBS 50% - SGF30% | 41% | 98% | 42% | 107% | 201% | 124% | |
| PLA 50% - PBS 50% - SGF50% | 58% | 250% | 62% | 257% | 100% | 130% | |
| PLA 50% - PBS 50% - SGF55% | 71% | 279% | 67% | 287% | 140% | 130% | — |
| PLA 50% - PBS 50% - SGF60% | 71% | 335% | 63% | 346% | 120% | 130% | — |

The invention claimed is:

1. A composite material comprising glass fiber and a polymer blend comprising polylactic acid (PLA) and polybutylene succinate (PBS), wherein the composite material comprises about 10 wt-% to about 80 wt-% of glass fiber, and wherein the polymer blend comprises about 20 wt-% to about 60 wt-% of PLA and about 40 wt-% to about 80 wt-% of PBS, wherein the glass fiber has the following composition:

$SiO_2$ 65-75 wt-%
$Na_2O$ 12-17 wt-%
CaO 8-11 wt-%
MgO 3-6 wt-%
$P_2O_5$ 0.5-2.5 wt-%
$B_2O_3$ 1-4 wt-%
$K_2O$ >0.5 wt-%-4 wt-%
SrO 0-4 wt-%, and
at most 0.3 wt-% in total of $Al_2O_3$ and $Fe_2O_3$.

2. The composite material of claim 1, wherein the polymer blend comprises about 30 wt-% to about 55 wt-% of PLA, based on the weight of the polymer blend.

3. The composite material of claim 1, wherein the polymer blend comprises about 40 wt-% to about 50 wt-% of PLA, based on the weight of the polymer blend.

4. The composite material of claim 1, wherein the polymer blend comprises about 50 wt-% of PLA, based on the weight of the polymer blend.

5. The composite material of claim 1, wherein the polymer blend comprises about 45 wt-% to about 70% wt-% of PBS, based on the weight of the polymer blend.

6. The composite material of claim 1, wherein the polymer blend comprises about 50 wt-% to about 60 wt-% of PBS, based on the weight of the polymer blend.

7. The composite material of claim 1, wherein the polymer blend comprises about 50 wt-% of PBS, based on the weight of the polymer blend.

8. The composite material of claim 1, wherein the content of the polymer blend of the composite material is in the range of about 20 wt-% to about 90 wt-%, based on the weight of the composite material.

9. The composite material of claim 1, wherein the content of the polymer blend of the composite material is in the range of about 60 wt-% to about 90 wt-%, based on the weight of the composite material.

10. The composite material of claim 1, wherein the composite material comprises from about 10% to about 70%, by weight, of glass fiber.

11. The composite material of claim 1, wherein the composite material comprises from about 15 wt-% to about 60 wt-% by weight, of glass fiber.

12. The composite material of claim 1, wherein the composite material comprises from about 20 wt-% to about 50 wt-% by weight, of glass fiber.

13. The composite material of claim 1, wherein the composite material comprises from about 30 wt-% to about 40 wt-% by weight, of glass fiber.

14. The composite material of claim 1, wherein the composite material comprises about 20 wt-% to about 40 wt-% of glass fiber and about 60 wt-% to about 80 wt-% of the polymer blend comprising about 50 wt-% of PLA and about 50 wt-% of PBS.

15. The composite material of claim 1, wherein the heat deflection temperature of the composite material, determined by ISO 75 method A, is 85° C. or above.

16. The composite material of claim 1, wherein the heat deflection temperature of the composite material, determined by ISO 75 method A, is 90° ° C. or higher.

17. The composite material of claim 1, wherein the heat deflection temperature of the composite material, determined by ISO 75 method A, is 95° C. or higher.

18. The composite material of claim 1, wherein the heat deflection temperature of the composite material, determined by ISO 75 method A, is 100° C. or higher.

19. The composite material of claim 1, wherein the heat deflection temperature of the composite article, determined by ISO 75 method B, is 85° C. or above.

20. The composite material of claim 1, wherein the heat deflection temperature of the composite article, determined by ISO 75 method B, is 90° C. or higher.

21. The composite material of claim 1, wherein the heat deflection temperature of the composite article, determined by ISO 75 method B, is 95° C. or higher.

22. The composite material of claim 1, wherein the heat deflection temperature of the composite article, determined by ISO 75 method B, is 100° C. or higher.

23. The composite material of claim 1, wherein the composite material has a notched Izod impact resistance, as measured according to ISO 180, of 10 KJ/m$^2$ or above.

24. The composite material of claim 1, wherein the composite material has a notched Izod impact resistance, as measured according to ISO 180, of 20 KJ/m$^2$ or above.

25. The composite material of claim 1, wherein the composite material has a notched Izod impact resistance, as measured according to ISO 180, of 30 kJ/m$^2$ or above.

26. An article comprising a reinforced composite material of claim 1.

27. The article of claim 26, wherein the article is injection molded, blow molded, compression molded, or extruded.

28. The article of claim 27, wherein the article is a molded article molded to a mold temperature of 20° ° C. to 50° C.

29. The article of claim 26, wherein the article has an average wall thickness of 0.6 mm or above.

30. A process for the production of a composite material of claim 1, the method comprising:
providing polylactic acid (PLA), polybutylene succinate (PBS) and glass fiber,
optionally providing further polymer(s) and ingredients,
blending PLA, PBS, optional further polymer(s) and optional ingredients together under heat treatment to provide a polymer melt in an extruder,
adding glass fiber to the polymer melt to provide a reinforced polymer melt,
extruding the reinforced polymer melt to provide a reinforced composite material,
optionally pelletizing the reinforced composite material.

* * * * *